United States Patent [19]

Readey et al.

[11] Patent Number: 4,973,566
[45] Date of Patent: Nov. 27, 1990

[54] CORDIERITE MATERIAL USEFUL IN A HEAT SOURCE RETAINER AND PROCESS FOR MAKING THE SAME

[75] Inventors: Michael J. Readey, Denver; Leonard D. Rontanini, Broomfield, both of Colo.

[73] Assignee: Coors Ceramics Company, Golden, Colo.

[21] Appl. No.: 352,737

[22] Filed: May 16, 1989

[51] Int. Cl.$^5$ .................. C04B 35/18; C04B 38/06
[52] U.S. Cl. ................... 501/129; 501/9; 501/82; 501/84; 501/144; 501/119
[58] Field of Search ............... 264/61; 501/9, 82, 39, 501/84, 118, 119, 129, 144; 502/80

[56] References Cited

U.S. PATENT DOCUMENTS

| | | | |
|---|---|---|---|
| 2,702,748 | 2/1955 | Heine | 501/82 |
| 2,907,686 | 10/1959 | Siegel | 131/2 |
| 3,200,819 | 8/1965 | Gilbert | 128/208 |
| 3,258,015 | 6/1966 | Ellis et al. | 131/171 |
| 3,356,094 | 12/1967 | Ellis et al. | 131/266 |
| 3,881,944 | 5/1975 | Beall et al. | 106/39 |
| 3,943,941 | 3/1976 | Boyd et al. | 131/2 |
| 3,950,175 | 4/1976 | Lachman et al. | 501/118 |
| 3,954,672 | 5/1976 | Somers et al. | 106/62 |
| 4,039,480 | 9/1977 | Watson et al. | 502/263 |
| 4,123,344 | 10/1978 | Davis | 264/61 |
| 4,280,845 | 7/1981 | Matsuhisa et al. | 106/62 |
| 4,416,675 | 11/1983 | Montierth | 55/502 |
| 4,476,236 | 10/1984 | Inoguchi et al. | 501/118 |
| 4,551,295 | 11/1985 | Gardner et al. | 264/177 |
| 4,698,317 | 10/1987 | Inoue et al. | 501/9 |
| 4,714,082 | 12/1987 | Banerjee et al. | 131/359 |

FOREIGN PATENT DOCUMENTS 1474147  4/1989  U.S.S.R. .

OTHER PUBLICATIONS

Characteristics of Kyocera's Technical Ceramics, cited to show inherent properties of material.

Primary Examiner—William R. Dixon, Jr.
Assistant Examiner—C. Melissa Bonner
Attorney, Agent, or Firm—Sheridan, Ross & McIntosh

[57] ABSTRACT

A porous cordierite ceramic and a process for making the same are provided by the present invention. Preferably, the ceramic material includes at least about 95 percent cordierite in the crystal phase, a porosity of at least about 30 volume percent, a crush load strength of at least about 6 pounds, and a thermal conductivity of less than about 5 watts/meter-°K. The method of producing a porous cordierite ceramic includes (a) combining alumina, clay, talc, a pore-forming material and preferably free silica; (b) adding binder, water and other additives; and (c) shaping the mixture to form a green body. The green body is thereafter fired to form a sintered ceramic body. The porous cordierite is useful in a heat source retainer.

28 Claims, 2 Drawing Sheets

//4,973,566

CORDIERITE MATERIAL USEFUL IN A HEAT SOURCE RETAINER AND PROCESS FOR MAKING THE SAME

FIELD OF THE INVENTION

The present invention broadly relates to cordierite ceramic material, and particularly relates to an insulating retainer made of porous cordierite, and a process for making the same.

BACKGROUND INFORMATION

Porous cordierite ceramics and methods of making such ceramics are generally known. For example, U.S. Pat. No. 3,950,175 issued Apr. 13, 1976 to Lachman et al. entitled "Pore Size Control in Cordierite Ceramics" discloses a porous cordierite ceramic having at least 20 percent of the pres greater than 10 microns in diameter and a mean pore size in the range of 3.3 to 12.6 microns in diameter. The control of pore-size is accomplished by substituting pyrophillite, kyanite, quartz or fused silica in the raw material batch as replacements for all or a portion of the talc or clay.

In U.S. Pat. No. 4,416,675 issued Nov. 22, 1983 for "High Capacity Solid Particulate Filter Apparatus," Montierth describes a honeycomb filter system of thin interconnected porous walls made of primarily cordierite ceramics. The thin, porous walls having a predetermined porosity and pore size maximizes the ability of the filter to entrap a significant portion of solid particulates while assuring adequate fluid flow through the filter. The predetermined porosity, i.e., the percentage of total volume not occupied by a solid material, required to accomplish the filtering purpose of the Montierth patent is disclosed as being in the range of 30 to 70 percent by volume, with a mean pore size greater than about 1 micron. For diesel exhaust gas particulate filtration, the mean pore size ranges from about 20 to 60 microns in diameter.

The cordierite ceramic disclosed in U.S. Pat. No. 4,280,845 issued July 28, 1981 to Matsuhisa et al. for a "Cordierite Ceramic" is specifically adapted for a catalyst support system having catalyst adhering ability. The mean pore size of the cordierite ceramic is disclosed as being in the range of 2 to 50 microns. Control of pore size is accomplished by the use of a magnesia raw material having an average particle size of 5 to 150 microns in the starting composition.

Typically, insulation from a heat source is desirable to prevent injury or discomfort to a user if the user is likely to come into physical contact with the heat source. Moreover, an insulating retainer for a hand-held heat source or one that is movable is preferably lightweight to ensure easy manipulation, yet sufficiently strong to maintain its integrity during normal use.

The problem of maintaining or increasing strength and insulation while minimizing weight has not been addressed by previous procedures relating to cordierite ceramics. Generally, strength and thermal conductivity can be increased by increasing the density of a material. Densification, however, such as by reduction of porosity, leads to a corresponding increase in weight of the finished part.

Previous approaches of providing insulation and containment of hand-held heat source devices have used a variety of materials. For example, U.S. Pat. No. 2,907,686 issued Oct. 6, 1959 to Siegel discloses a sheathing overwrap comprised of concentrated sugar solutions, hard gum or resins to contain a heat source described therein.

U.S. Pat. No. 3,943,941 issued Mar. 16, 1976 to Boyd et al. discloses the use of a non-porous carbon mat as a non-combustible retainer to hold a synthetic carbon fuel used as a heat source to activate a product.

Finally, U.S. Pat. No. 3,200,819 issued Aug. 17, 1965 to Gilbert discloses a heating element encased in an external tube made of plastic or fiberglass. This patent further discloses an interior lining comprised of ceramic used to insulate an external tube from a heating element. Although the Gilbert patent generally discloses the use of ceramic material for insulation purposes, it does not describe nor teach the specific properties or qualities desirable, e.g., for effective insulation.

Accordingly, it would be advantageous to find a lightweight, strong material capable of providing effective insulation from a heat source to prevent injury or discomfort to a user.

SUMMARY OF THE INVENTION

The present invention relates to a cordierite ceramic material and a process for producing the cordierite ceramic material. In a preferred embodiment, the porous cordierite is employed in a strong, light-weight retainer that provides effective insulation from a heat source contained within said holder to prevent injury or discomfort to a user. The terms "retainer" and "holder" as referred to herein are used interchangeably. The retainer of the present invention is useful for many purposes including, for example, a hand-warming device, an insulating component as described in U.S. Pat. No. 3,200,819 to Gilbert, or any other device which encases a heat source. The invention further relates to a ceramic material, particularly a cordierite ceramic, and a method of making the same in which porosity is used to simultaneously control weight, strength and thermal conductivity. When required, porosity is also used to control air flow to a heat source.

In a preferred embodiment, the heat source retainer of the present invention comprises a porous ceramic material of at least about 95 percent cordierite in the crystal phase having a porosity of between about 40 and about 60 percent, a pore size distribution wherein about 95 percent of the pores have a size between about 4 microns and about 20 microns, and an average pore size in the range from about 8 to about 12 microns. Unless otherwise indicated, percent porosity will be understood to mean percent by volume. The density of this embodiment preferably ranges from about 1.1 to about 1.6 g/cc, and more preferably about 1.3 g/cc, to obtain the desired crush load strength of greater than about 6 pounds, and more preferably greater than about 10 pounds. It has been advantageously found that increasing porosity can offset the effects of increased density on the weight of a material while maintaining its overall strength and insulating capabilities within desired bounds. The offsetting function of porosity is limited by the need to maintain the physical integrity of the fired material, i.e. a higher porosity will typically compromise the mechanical strength of the material. Consequently, one of the advantages of the present invention is the discovery that a particular range of porosity can be used to control strength, thermal conductivity and weight, without diminishing strength to an undesired degree.

To provide effective insulation from a heat source, the thermal conductivity of the preferred embodiment is less than about 5 watts/meter-°K. The thermal expansion about $2 \times 10^{-6}$/°C. over the temperature range of 25° C. and 800° C. to allow sufficient thermal shock resistance such that the material produced is able to withstand the heat generated by a heat source. The retainer of the preferred embodiment is tube-shaped with an annular cross-section. In the most preferred embodiment, the tube-shaped retainer has a length of about 25 mm, an outside diameter of about 7.5 mm, an inside diameter of about 6.0 mm, and weighs about 0.5 grams. A heat source is held securely within the retainer by means which allows air flow around said heat source.

The present invention also includes a porous cordierite and a process for making a porous cordierite ceramic useful, e.g., as a heat source retainer which preferably includes the steps of: (1) forming a starting inorganic powder mixture by combining effective amounts of alumina, talc and/or clay; (2) combining the starting mixture with a pore-forming material, preferably walnut shell powder, capable of forming a final product having about 40 to 60 percent porosity to form a raw batch mixture; (3) adding a binder to said raw batch mixture to form a binder mixture; (4) adding water to said binder mixture to form an extrudable paste; (5) forming said paste into a green body; (6) drying said green body to form a dried green body; and (7) heating said dried green body to a firing temperature sufficient to disintegrate said pore-forming material thereby forming a sintered porous cordierite ceramic.

The present invention also includes a process for making a porous cordierite ceramic that includes some or all of the steps described above in addition to a step of calcining the starting inorganic mixture comprising alumina, talc and clay at a temperature in the range of 1200° C. and 1395° C., preferably at 1325° C., for a period of up to about 12 hours, preferably about 6 hours. The calcined mixture is then comminuted to a fine particle size by any conventional means, such as ball-milling. Thereafter, the calcined and milled mixture is combined with a pore-forming material and is further processed as described in steps (3)–(7) above. The present invention thus relates to the advantageous discovery of a ceramic material, and particularly a porous cordierite ceramic, that provides the desired insulation coupled with strength and low weight.

Preferably, a tube-shaped retainer is provided by any of the processes described above. In one embodiment of the invention, prior to firing a formed green tube, a rod having a higher thermal expansion coefficient than cordierite is inserted into said green tube. After firing, the rod is removed from the sintered cordierite ceramic.

DETAILED DESCRIPTION OF PREFERRED EMBODIMENTS

Figure 1:
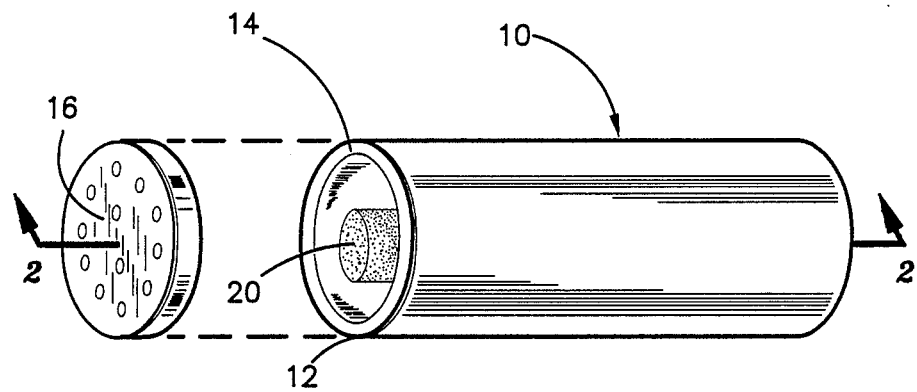
FIG. 1 is a partially exploded perspective side view of a ceramic heat-source retainer having a heat source therein and an end cap.

The present invention relates to a porous cordierite ceramic material. The porous ceramic material is especially useful in producing a heat source retainer capable of being used for a variety of purposes for which a heat source is required. The preferred ceramic material of the present invention is advantageously suitable for providing effective insulation from a heat source and is sufficiently strong to withstand the forces acting upon said retainer during normal use, yet lightweight for ease of manipulation. A further advantage of the present invention is that it relates to an efficient, convenient and economic method for providing a ceramic material having the desired qualities.

It has been found that porosity can be effectively used to control strength, weight, thermal conductivity and other properties of a ceramic material in a manner so as to obtain the desired balance of the above-described qualities. It has further been found that porosity can be used to provide the proper amount of air flow through a retainer to maintain a heat source if necessary.

In a preferred embodiment, the heat source retainer of the present invention includes at least about 95 percent cordierite in the crystal phase, to provide the desired qualities of strength, density, thermal conductivity, and, preferably, thermal shock resistance.

Preferably, the cordierite ceramic should have a porosity of at least about 30 percent, preferably between about 45 percent and about 60 percent porosity, and more preferably about 50 percent. The pore size distribution within the ceramic material is preferably about 95 percent of the pores having a size between about 4 and about 20 microns in diameter, with the preferred average pore size in the range of about 8 to about 12 microns in diameter.

The preferred porosity should provide sufficient air flow to a heat source if required. By way of illustration, for a carbon fuel source such as charcoal, sufficient air should reach the charcoal to keep it burning. The amount of air necessary can readily be determined by one skilled in the art and depends on several factors, including, for example, the amount of charcoal contained within the porous holder, the shape of the charcoal and whether there are airflow pathways other than through the porous cordierite.

The porosity also affects crush load strength of the final product. In a preferred embodiment of the present invention, the crush load strength is preferably at least about 6 pounds, and more preferably at least about 10 pounds. Corresponding to the preferred range of strength, the preferred density range is about 1.1 to about 1.6 g/cc, and more preferably about 1.3 g/cc. The term strength, as referred to herein, is defined as the crush load strength, which is the weight a device can withstand, applied to the part by two parallel plates, measured in pounds. The crush load strength is measured by positioning a device or part, such as an annular tube with the above-described dimensions, between two parallel rigid plates and increasing the weight of the upper plate until the device or part fails.

In addition to strength, density also affects, in part, the thermal conductivity of cordierite. Thermal conductivity can be used as a measure of the amount of insulation provided by a material. Increased porosity serves to lower the thermal conductivity of a material thereby providing better insulation. However, increased porosity also undesirably decreases the strength of a material. Consequently, porosity can be advantageously used to lower thermal conductivity and to provide a lighter-weight part. The amount of porosity, however, is limited by the need to maintain the physical integrity of the material. Accordingly, it has been found that the preferred thermal conductivity to provide effective insulation should be no greater than about 5 watts/m-°K., and more preferably not more than about 2 watts/m-°K., to correspond to the preferred ranges of the other desired qualities including strength and weight.

Moreover, a material with a low thermal expansion coefficient is desirable when used as a heat source retainer to provide good thermal shock resistance, which is needed when a material is in contact with or in close proximity to a heat source. To obtain good thermal shock resistance, the thermal expansion coefficient, suitable for use as a heat-source retainer, is preferably in the range of about 1 to about $2 \times 10^{-6}/°C$. over the temperature range of 25° C. to 800° C.

In a preferred embodiment of the present invention as depicted in FIG. 1, a heat-source retainer 10 having an annular cross section is tubular in shape. To illustrate the preferred relationship between size and weight, if the length of the retainer 10 is about 25 mm long, the outer diameter 12 of the retainer 10 is about 7.5 mm, and the inside diameter 14 is about 6.0 mm, then the preferred weight of the retainer 10 should be no greater than about 0.5 grams. The preferred shape, dimensions and weight of the preferred embodiment will vary depending on the intended use.

A cap 16 is an optional part, which is shown in FIG. 1 for completeness of detail. The cap 16 can be comprised of any material compatible with the intended use of the retainer 10 which can be securely affixed to the retainer 10.

Figure 2:
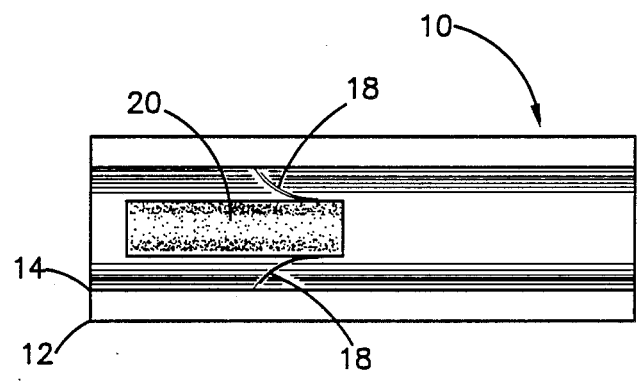
FIG. 2 is a cross-sectional view of the retainer of FIG. 1 taken along line 2—2 of FIG. 1.

In FIG. 2, springs 18 are shown as means for holding a heat source 20. Although springs 18 are depicted in FIG. 2, any means readily known to one skilled in the art for securely affixing a heat source 20 within the retainer 10 can be used as long as sufficient air flow is maintained around said heat source 20 if required.

Depending upon the intended use, a retainer of the present invention can be used independently or as a component part of a larger system. For example, if the retainer is used as a hand-warming device, it can substantially encase a heat source and be useful as a device in itself. On the other hand, a retainer can be used as a component part of a system similar to the one described, for example, in U.S. Pat. No. 3,200,819 issued to Gilbert. As a variation, a retainer with a heat source securely affixed therein can form a cartridge-like component which can be detachably affixed to a larger system.

Figure 3:
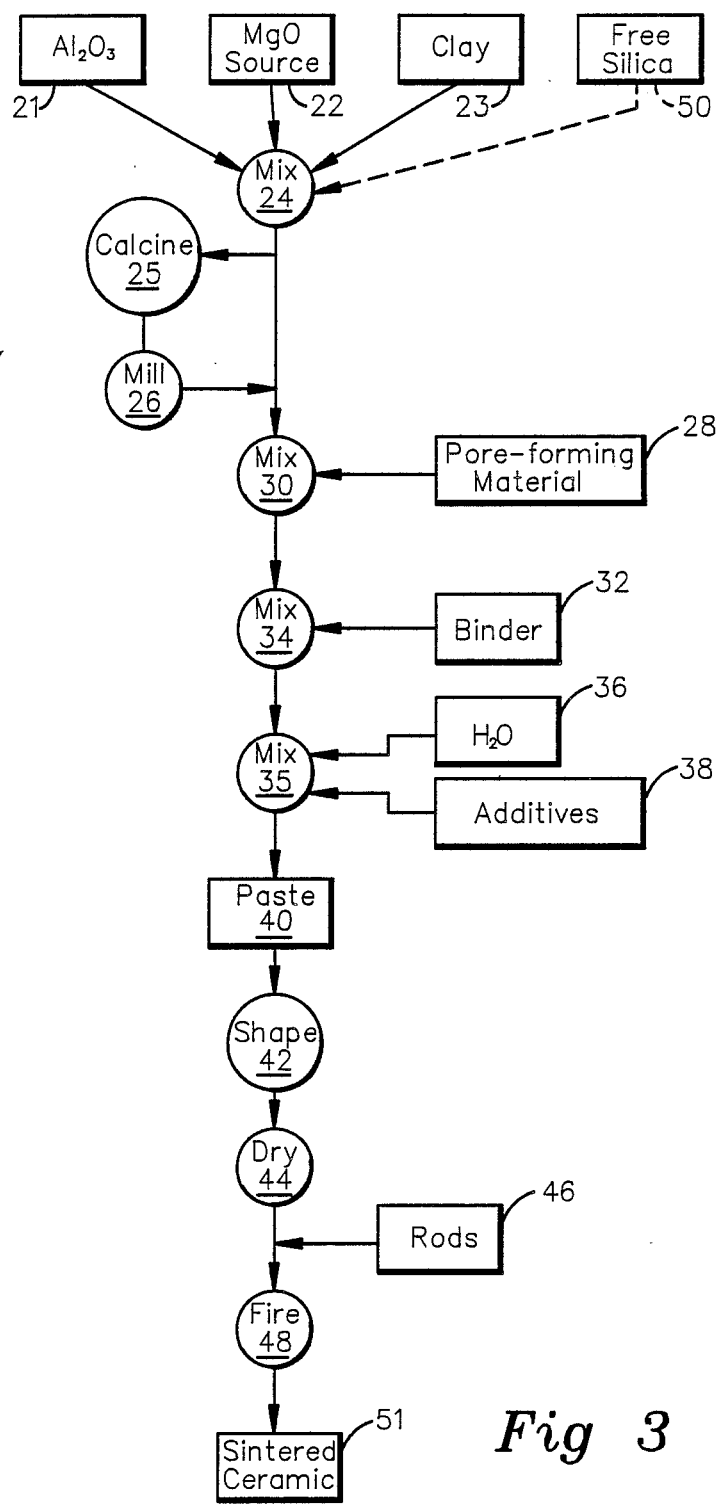
FIG. 3 is a schematic flow chart of a method for making a porous cordierite ceramic, with optional steps indicated by dotted lines.

Referring now to FIG. 3, in a preferred method of preparing a precursor green body and a final ceramic material suitable as a heat source holder, effective amounts of alumina 21, a magnesia (MgO) source 22 and clay 23 are mixed 24 to form a starting inorganic powder mixture. The powder preferably includes about 10 to about 15 percent by weight alumina, about 40 to about 45 percent by weight MgO source, such as talc, and about 40 to about 45 percent by weight clay, and more preferably about 14.5 percent alumina, about 41.8 percent talc, and about 43.7 percent clay. The alumina is normally dry ball-milled to form a powder having an average particle size of up to about 5 microns.

Although, in place of talc, any material containing MgO capable of forming cordierite can be used, talc, (e.g., Yellowstone Talc), is preferred in part for its plate-like microstructure. The plate-like microstructure provides for good mixing and extrusion as described in more detail below. The talc is preferably powdered to an average particle size of up to about 1 micron prior to mixing with the other inorganic powders.

Materials containing $SiO_2$ capable of forming cordierite with the other starting materials can be used in place of clay. Preferably $SiO_2$-containing clay is used, with kaolin (e.g., EP Kaolin) being the preferred clay. As with talc, kaolin is preferred in part for its plate-like microstructure. The plates of kaolin and talc align during the extrusion process thereby providing good slippage and easier extrusion of a green body. Kaolin is preferably in powder form having an average particle size of up to about 1 micron.

The starting inorganic powder mixture is preferably not calcined. It is believed a calcining process produces sphere-like particles rather than plate-like particles, that do not provide good slippage during extrusion, thereby making the extrusion process more difficult.

Control of impurities, such as iron, titania and soda, contained in the starting inorganic powders 21, 22, 23 is desired. For example, high iron content tends to discolor the fired ceramic to a yellowish color. Preferably, the starting inorganic powder mixture 24 contains no more than about 1 percent total impurities.

The starting inorganic powders are combined 24, preferably at room temperature, by methods commonly used in the art, such as with a ball-mill, a blender, or other conventional mixers.

The inorganic powder mixture can then be calcined 25 and milled 26, although calcination is not preferred for a variety of reasons. First, calcination is believed to disrupt the plate-like microstructure of the talc and kaolin and form sphere-like particles. As described above, the plate-like microstructure of talc and kaolin provides good slippage during the extrusion process, which in turn provides for better extrusion than with sphere-like particles. A further advantage of omitting the calcining step is that the crush load strength of the fired ceramic has been found to improve by 25 to 30 percent compared with the strength of a calcined ceramic. On the other hand, a disadvantage of omitting the calcining step is that increased shrinkage occurs during the firing step. In at least one test, omission of the calcining step resulted in a 12 percent shrinkage compared with 6 percentage shrinkage when the starting inorganic powder mixture was subjected to calcination. Decreased shrinkage is preferable to obtain a more porous material, as described in greater detail below.

If the inorganic powder mixture is calcined 25, the mixture is heated to a temperature between about 1200° C. and about 1395° C., preferable at about 1325° C. As known to those skilled in the art, the calcination time can be adjusted to ensure that the bulk of the powdered mixture reaches the desired calcination temperature. The normal calcination time is up to about 12 hours, and more preferably about 6 hours. The calcined mixture is then milled 26 by any conventional milling process, such as ball-milling, until the average particle size is preferably less than about 10 microns.

Pore-forming materials 28 can then be added to the calcined and milled mixture or directly to the inorganic powders, if the calcining process is omitted, and mixed 30 to form a resulting raw batch mixture. Generally, any pore-forming material 28 capable of volatilizing, oxidizing, or otherwise disintegrating at the desired sintering temperature can be used, including, for example, latex spheres, rubber particles, plastic polymer resin, or more preferably nut shells. The particle size of the selected pore-forming material 28 is the primary determinant of pore sizes in the final sintered product, while the amount of the material, along with the sintering temperature, determines porosity. Walnut shell flour is preferred as the pore-forming material 28 because of its availability and low cost. The walnut shells are ground or milled to form a powder having a particle size of less than 325 mesh size, based on the Tyler Equivalent mesh designation. This mesh size corresponds to a particle size ranging from about 1 to 35 microns. It has been found that this preferred range of particle size normally provides an average pore size of about 8 to about 12 microns and a particle size distribution of wherein about 95 percent of the pores have a size between about 4 and about 20 microns in a fired ceramic. To obtain a desired porosity, the walnut shell powder comprises from about 20 percent to about 40 percent by weight, and more preferably about 35 percent by weight, of the raw batch composition.

An organic binder 32 is then added to the resulting raw batch composition to form a binder mixture. Mixing 34 the binder with the raw batch composition can be accomplished by any conventional methods known to one skilled in the art. Preferably a cone blender, such as a PK blender, is used to blend the binder with the raw batch composition.

Any organic binder which is relatively fluid or workable, i.e., mixable, at low temperatures, such as room temperature, and which gels or sets at an elevated temperature such as in the range from about 40° C. to about 45° C. can be used. Preferred binders of the present invention include methyl cellulose, butyl stearate such as Triton X-100 mixed with glycerine if desired, or mixtures thereof, and more preferably a methyl cellulose binder designated as "Methocel," which is produced by Dow Chemical as the "20-214 Methocel" formulation. Another Dow Chemical Methocel formulation, designated as the 413 system, can be used, although the gelling temperature of this binder system is different from the 20-214 formulation. Such binders 32 can be added, as required, to allow formation of a compact green body having sufficient strength to allow compaction to the desired shape. The preferred amount of binder 32 ranges from about 2 percent to about 5 percent by weight, and more preferably about 4 weight percent, of the inorganic powder mixture.

The dry binder mixture is then transferred to any conventional mixer or blender 35 capable of mixing water with the binder mixture to form a well-mixed paste 40, such as a rotating blade or sigma mixer. Water 36 is slowly added to the binder mixture to form a paste 40 having a water content of about 36 to about 42 percent water, and more preferably about 40 percent water. Hot water 36 in the temperature range of about 160° F. and 180° F., and preferably about 170° F., is used to evenly disperse the binder throughout the paste 40. Too little water results in inadequate mixing of the binder which causes a need for high pressures to shape the resulting green body. If an excess of water is added, drying the green body becomes very difficult and slumping tends to increase.

Other additives 38 typically used in the ceramic arts can be added during the paste formation. For example, about 1 percent by weight glycerine can be added to provide lubricity during the compaction process if desired. If a methocel binder system is used, about 1 percent by weight butyl stearate is typically added to modify the binder as suggested by the manufacturer. The combined amount of glycerine and butyl stearate should be no greater than about 2 percent by weight of the slurry.

Because conventional iron-lined mixers, including standard sigma mixers, tend to turn the final ceramic product yellowish, the preferred method of mixing 35 the paste mixture incorporates a recycling mixer, such as a Ross mixer. In the recycling mixer, the mixed binder slurry is extruded, chopped and recycled for further mixing. The components are then mixed to a clay-like consistency and subsequently transferred to a Fitzpatrick mill. The Fitzpatrick mill contains a series of chopping blades that granulate the clay-like mixture to remove a substantial portion of entrapped air within the mixture. The resulting granulated particles or pellets can then be vacuum de-aired and shaped 42, for example, in a ram-type extruder.

Standard commercial methods of shaping 42 can be used to form a green body, including, for example, dry pressing, slip casting, injection molding, isostatic pressing, or, preferably, extrusion. Any desired configuration, for example a sphere, a block, a cube, or a tube can be obtained by the standard methods of shaping, limited only by the shape-forming ability of the shaping device used. The preferred embodiment of the present invention is a tube-shaped, heat-source retainer having an annular cross section.

According to the present invention, any known extruder can be used. Preferably, the extruder incorporates a cooling component to prevent the extruded material from becoming too hot thereby causing the material to prematurely gel or set. Preferably, a water-cooled die extruder, such as a ram-type extruder, can be used to extrude the clay-like paste at a rate of about 20 feet per minute. In the most preferred embodiments, a vertical extruder having a drying component 44 located below for immediate drying and setting is used to minimize distortion or slumping resulting from gravity. Preferably, a multiple green body extruder is used to simultaneously produce more than one green body.

Upon extrusion, a compact green body can be extruded onto a belt system and immediately dried 44 by any conventional drying method known in the art. For example, a radio frequency drier, or an infrared oven-type device, which can be less expensive to operate than a radio frequency drier, can be used to dry and set the extruded green body lying on the belt system. The preferred method is to extrude the green body onto an air-bearing device that immediately delivers hot air to dry and set the compacted body. One advantage of the air-bearing device over the belt system is that less deformation occurs since the formed green body is not in physical contact with another object such as a belt.

After drying and setting, the green body is then removed from the drying system and cut into any length or shape if desired. In the preferred embodiment, the green tubes are preferably cut into 3-foot lengths and subsequently placed on a V-groove plaster board for further drying. After drying is completed, the green tubes are further broken or cut into 1-foot lengths. Thereafter, rods 46 are inserted into the shortened green tubes prior to heating. The rods serve two primary functions. First, the rods 46 determine the inside wall diameter 14 of the final cordierite tube as shown in FIG. 1, since cordierite shrinks around the rod. The second function is to prevent and/or control the amount of slumping that typically occurs when the components of the green tube reach a glassy phase during the heating step 48. Without the use of the rods, the preferred formulation tends to slump about 0.002 inches. Such slumping, although small, can make the part unusable when the heat retainer forms part of a larger composition such as one produced by automatic machinery requiring close part tolerance. Any material having a thermal expansion coefficient greater than that of cordierite, which is about 1 to about $2 \times 10^{-6}/°C$. over a temperature range from 25° C. to 800° C. can be used as the rod material. Preferably the rods 46 are made of essentially pure alumina, and more preferably greater than 99 percent pure alumina. Alumina is known to have a thermal expansion coefficient of about 8 to $9 \times 10^{-6}/°C$., which provides for easy removal of the rod from the fired tube since alumina shrinks more than cordierite upon cooling.

An alternative to the use of alumina rods to control slumping is to start with an inorganic powder formulation that provides for a more refractory material. A higher percentage of alumina 21, talc 22, or both can be used in the raw batch composition. Preferably a formulation is used comprising about 14 percent by weight alumina 21, about 16 percent by weight kaolin 23, and about 70 percent by weight talc 22. A portion of the alumina 21 or talc 22 can be replaced by free silica 50 to provide additional strength, as described below.

After complete drying, the green bodies and, if desired, support rods are then transferred to a carrier, if required, and heated 48 to a firing temperature. The firing temperature affects the amount of shrinkage of the green bodies in that higher temperatures increase shrinkage, which in turn affects the porosity of the sintered ceramic—i.e., the diameter of the pores and/or porosity tend to decrease upon shrinkage. Consequently, lower temperatures are desirable to produce a more porous body. Conversely, higher temperatures are desired to produce a more dense and therefore stronger material in addition to increasing the speed of processing. To offset the need for higher temperatures to produce a stronger body, glass frit or free silica 50 can be added to the raw batch composition. Moreover, up to about 35 percent by weight pore-forming materials 28, preferably walnut shell powder, can be added to produce a more porous body to compensate for the decreased porosity resulting from higher temperatures. In balancing these considerations, the firing temperature must, nevertheless, be in the proper range to produce a ceramic 51 having not less than about 95 percent cordierite in the crystal phase and to disintegrate the pore-forming materials to create the pores or voids in the fired ceramic 51. The firing temperature is preferably below 1400° C., which is the approximate melting temperature of cordierite.

In view of the foregoing factors, the preferred firing temperature is in the range of about 1250° C. and about 1350° C., and more preferably about 1320° C. The desired temperature is maintained for a period of up to about 5 hours, preferably for about 2 hours.

The fired cordierite ceramic material 51 is thereafter cooled to ambient temperature by any means known in the art. If required, rods 46 or other shape-forming aids are then removed from the sintered material. Subsequent surface finishing or cutting can be performed if desired.

The following example is provided by way of illustration and not by way of limitation.

EXAMPLE 1

A tube-shaped heat-source holder having an annular cross section was prepared by first mixing alumina, kaolin and yellowstone talc powders to form an inorganic powder mixture comprising about 14.5 percent by weight Alcan C72 alumina, about 43.7 percent by weight kaolin, and about 41.8 percent by weight talc. Agrishell WF7 Walnut shell flour having a particle size of less than 325 mesh based on the Tyler Equivalent was added to the inorganic powder mixture to form a raw batch composition. The walnut shell powder comprised about 35 percent by weight of the raw batch composition. Thereafter, Methocel 20-214, an organic binder obtained from Dow Chemical Company, was thoroughly dry-mixed with the raw batch composition in a PK cone blender to form a binder mixture. The binder amounted to about 5.5 percent by weight of the combined inorganic starting powders. After blending, the dry binder mixture was transferred to a sigma mixer wherein 170° F. water was slowly added to the binder mixture to form a clay-like paste. The paste was thereafter extruded at a rate of about 20 feet per minute from a water-cooled ram-type extruder to form a compacted green tube having an annular cross section. The formed green tube was extruded onto a belt system and immediately dried and set with a radio frequency drier. The dried and set green tube was then cut into 3-foot lengths and subsequently transferred to a V-groove plaster board for further drying. Upon drying, the green tubes were further broken into 1-foot lengths for easier handling. Thereafter, about 99.8 percent pure alumina rods were inserted into the dried green tubes, placed into a carrier, and fired at 1320° C. for about 2 hours. The fired cordierite tubes were removed from the alumina rods and cut into 25 mm lengths having a 7.5 mm outside diameter, an inside diameter of about 6.0 mm, and a weight of about 0.5 grams. The final heat-source retainer produced by this method exhibited about 95 percent cordierite in the crystal phase, a crush load strength of about 10.2 pounds, a density of about 1.3 g/cc, a porosity of about 50 percent, an average pore size of about 8 to 12 microns, a particle size distribution wherein about 95 percent of the pores are between about 4 to about 20 microns, and a thermal conductivity of about 2 watts/meter-°K.

EXAMPLE 2

A tube-shaped heat-source holder was prepared by dry mixing 12.5 weight percent alumina, 37.7 weight percent kaolin, 27.3 weight percent $MgCO_3$ and 22.5 weight percent $SiO_2$. To this mixture was added about 20 weight percent (based on the total weight of the dry mixture) −325 mesh walnut flour and about 3 percent Dow 20-214 Methocel. About 1 percent by weight glycerin was predissolved in 35–37 weight percent hot water at 170° F. The powder mix was transferred to a Sigma-type mixer. The hot water was added and the batch was mixed for about 20–30 minutes. The batch was then broken up using a chopper mill. The plastic mixture can then be extruded using a ram or auger type extruder, dried, broken up into lengths and fired as described in Example 1.

Although the preferred embodiments have been described by way of illustration and example, a number of variations and modifications of the invention, as known to those skilled in the art, can be practiced within the scope of the present invention as limited only by the appended claims.

What is claimed is:

1. A ceramic body comprising porous cordierite wherein:
   at least 95 percent is cordierite in a crystal phase;
   the porosity is at least about 45 volume percent;
   95 percent of the pores are within the size range of from about 4 microns to about 20 microns;
   the average pore size is from about 8 microns to about 12 microns;
   the density is from about 1.1 to about 1.6 grams/cubic centimeter.

2. A green body, comprising:
   from about 10 weight percent to about 15 weight percent alumina, from about 40 weight percent to about 45 weight percent clay, from about 40 weight percent to about 45 weight percent talc, from about 0 weight percent to about 10 weight percent free silica, and from about 20 weight percent to about 40 weight percent based on the total mixture of a pore-forming material capable of volatilizing, oxidizing, or otherwise disintegrating below the sintering temperature;
   wherein said pore-forming material has a particle size of less than about 35 microns; and
   wherein said green body is capable of providing, after firing, a ceramic body comprising at least about 95 percent cordierite in the crystalline phase, with at least 45 percent porosity, wherein the average pore size is between about 8 microns and about 12 microns.

3. A green body, as claimed in claim 2, wherein:
   said pore-forming material is selected from the group consisting of yeast, nut shells, latex spheres, plastic polymer resins and mixtures thereof.

4. A method for making a green body, comprising the steps of:
   forming an inorganic mixture including about 10 to about 15 percent by weight alumina, about 10 to about 45 percent by weight of a magnesia source, and about 40 to about 45 percent by weight clay, and about 0 weight percent to about 10 weight percent free silica;
   adding from about 20 to about 40 percent by weight of a pore-forming material capably of volatilizing, oxidizing or otherwise disintegrating below the sintering temperature, wherein said pore-forming material has a particle size less than about 35 microns and is capable of forming a porous cordierite having a porosity of at least 45 percent wherein the average pore size is between about 8 and about 12 microns, to form a raw batch;
   adding water and a binder to form a paste from said raw batch; and
   forming a green body from said paste.

5. A method for making a ceramic body, comprising the steps of:
   forming an inorganic mixture by mixing effective amounts of alumina, clay and a magnesia source to produce, after firing, said ceramic body comprising at least about 95 percent cordierite in the crystalline phase;
   adding to said inorganic mixture from about 20 weight percent to about 40 weight percent of a pore-forming material capable of volatilizing, oxidizing or otherwise disintegrating below the sintering temperature, wherein said pore-forming material has a particle size of less than about 35 microns, in an amount effective to produce, after firing, at least about 45 percent porosity, wherein the average pore size is between about 8 and about 12 microns, to form a mixture;
   adding water and a binder to said mixture to form a paste;
   forming a green body from said paste; and
   heating said green body to a firing temperature in the range from about 1250° to about 1350° C. to form a porous cordierite body.

6. A method, as claimed in claim 5, wherein:
   said mixture comprises about 20 percent for up by weight of said pore-forming material.

7. A method, as claimed in claim 5, further comprising a step of:
   adding free silica to said inorganic mixture to form a second inorganic mixture comprising about 5 weight percent free silica.

8. A method, as claimed in claim 5, wherein:
   said pore-forming material comprises material selected from the group consisting of yeast, nut shells, latex spheres and plastic polymer resins.

9. A method, as claimed in claim 5, wherein:
   said pore-forming material comprises walnut shells.

10. A method, as claimed in claim 5, further comprising the step of:
    calcining said inorganic mixture at a temperature between about 1200° and about 1395° C. to form a calcined mixture prior to adding said pore-forming material.

11. A method, as claimed in claim 5, wherein:
    sufficient water is added to produce said paste having a water content from about 36 percent to about 42 percent water.

12. A method, as claimed in claim 5, wherein:
    said step of forming a green body includes extrusion.

13. A method, as claimed in claim 5, further comprising a step of:
    inserting a shape-forming aid into said green body prior to said heating.

14. A method, as claimed in claim 5, further comprising a step of:
    inserting a rod into said green body prior to said heating, said rod having a thermal expansion coefficient greater than that of cordierite.

15. A method, as claimed in claim 5, further comprising a step of:
    inserting a shape-forming rod into said green body prior to said heating, wherein said shape-forming rod comprises alumina.

16. A method, as claimed in claim 5, wherein said step of forming an inorganic mixture comprises:
    forming an inorganic mixture which includes about 14 weight percent alumina.

17. A method, as claimed in claim 5, wherein said step of forming an inorganic mixture comprises:
    forming an inorganic mixture which includes about 44 weight percent clay.

18. A method, as claimed in claim 5, wherein said step of forming an inorganic mixture comprising:
    forming an inorganic mixture which included about 42 weight percent magnesia source.

19. A method, as claimed in claim 5, wherein:
said magnesia source comprises talc.

20. A method, as claimed in claim 5, wherein:
said porous cordierite body has a density of between about 1.1 and about 1.6 g/cc.

21. A method, as claimed in claim 5, wherein:
said porous cordierite body has a porosity of about 50 percent.

22. A method, as claimed in claim 4, further comprising a step of:
adding free silica to said inorganic mixture to form a second inorganic mixture comprising about five weight percent free silica.

23. A method as claimed in claim 4, wherein:
said pore-forming material comprises walnut shells.

24. A method, as claimed in claim 4, wherein:
sufficient water is added to produce said paste, having a water content from about 36 percent to about 42 percent water.

25. A method, as claimed in claim 4, wherein said step of forming an inorganic mixture comprises:
forming an inorganic mixture which includes about 14 weight percent alumina.

26. A method, as claimed in claim 4, wherein said step of forming an inorganic mixture comprises:
forming an inorganic mixture which includes about 44 weight percent clay.

27. A method, as claimed in claim 4, wherein said step of forming an inorganic mixture comprises:
forming an inorganic mixture which includes about 42 weight percent magnesia source.

28. A method, as claimed in claim 4, wherein:
said magnesia source comprises talc.

* * * * *

UNITED STATES PATENT AND TRADEMARK OFFICE
CERTIFICATE OF CORRECTION

PATENT NO. : 4,973,566

DATED : November 27, 1990

INVENTOR(S) : Michael J. Readey and Leonard D. Rontanini

It is certified that error appears in the above-identified patent and that said Letters Patent is hereby corrected as shown below:

Column 1, line 18, delete "pres" and insert therefor --pores--.

Column 3, lines 3 and 4, after "expansion" insert --coefficient is preferably in the range of about 1 to--.

Column 8, line 40, delete "embodiments" and insert therefor --embodiment--.

Column 12, line 2 of Claim 6, delete "for up" and insert therefor --to about 35 percent--.

Column 12, line 3 of Claim 18, delete "included" and insert therefor --includes--.

Signed and Sealed this

Seventh Day of April, 1992

*Attest:*

HARRY F. MANBECK, JR.

*Attesting Officer*   *Commissioner of Patents and Trademarks*